US010359976B2

(12) United States Patent
Inoue

(10) Patent No.: US 10,359,976 B2
(45) Date of Patent: Jul. 23, 2019

(54) IMAGE FORMING APPARATUS, INFORMATION PROCESSING SYSTEM, AND METHOD FOR CONFIGURING IMAGE FORMING APPARATUS

(71) Applicant: Takuya Inoue, Kanagawa (JP)

(72) Inventor: Takuya Inoue, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/992,368

(22) Filed: May 30, 2018

(65) Prior Publication Data

US 2018/0349075 A1  Dec. 6, 2018

(30) Foreign Application Priority Data

May 31, 2017  (JP) ................. 2017-108696

(51) Int. Cl.
| | | |
|---|---|---|
| *H04N 1/04* | (2006.01) | |
| *G06F 3/12* | (2006.01) | |
| *G06F 21/44* | (2013.01) | |
| *G06F 21/31* | (2013.01) | |
| *H04L 12/24* | (2006.01) | |
| *G06F 8/61* | (2018.01) | |

(52) U.S. Cl.
CPC ............ *G06F 3/1232* (2013.01); *G06F 3/123* (2013.01); *G06F 3/1204* (2013.01); *G06F 3/1231* (2013.01); *G06F 3/1257* (2013.01); *G06F 8/63* (2013.01); *G06F 21/31* (2013.01); *G06F 21/445* (2013.01); *H04L 41/0846* (2013.01); *G06F 3/1205* (2013.01)

(58) Field of Classification Search
CPC ...... G06F 3/1232; G06F 3/131; G06F 21/445; G06F 21/31

USPC ........................................................ 358/1.15
See application file for complete search history.

(56) References Cited

U.S. PATENT DOCUMENTS

| | | |
|---|---|---|
| 2012/0147419 A1 | 6/2012 | Inoue et al. |
| 2012/0198534 A1 | 8/2012 | Ohta et al. |
| 2015/0109638 A1* | 4/2015 | Sasaki .................. G06F 3/1205 358/1.15 |

FOREIGN PATENT DOCUMENTS

| | | |
|---|---|---|
| JP | 2012-226662 | 11/2012 |
| JP | 2014-217996 | 11/2014 |

\* cited by examiner

*Primary Examiner* — Houshang Safaipour
(74) *Attorney, Agent, or Firm* — Harness, Dickey & Pierce, P.L.C.

(57) ABSTRACT

An image forming apparatus, an information processing system, and a method for configuring the image forming apparatus. The image forming apparatus includes circuitry configured to read setting data stored in a storage medium, determine whether the read setting data is first setting data available for another image forming apparatus or second setting data available for the image forming apparatus, configure the image forming apparatus using the second setting data, based on a determination that the read setting data is the second setting data, and configure the image forming apparatus using the first setting data, based on a determination that the read setting data is the first setting data and the another image forming apparatus is the same as the image forming apparatus. The information processing system includes the image forming apparatus and an information processing apparatus.

16 Claims, 16 Drawing Sheets

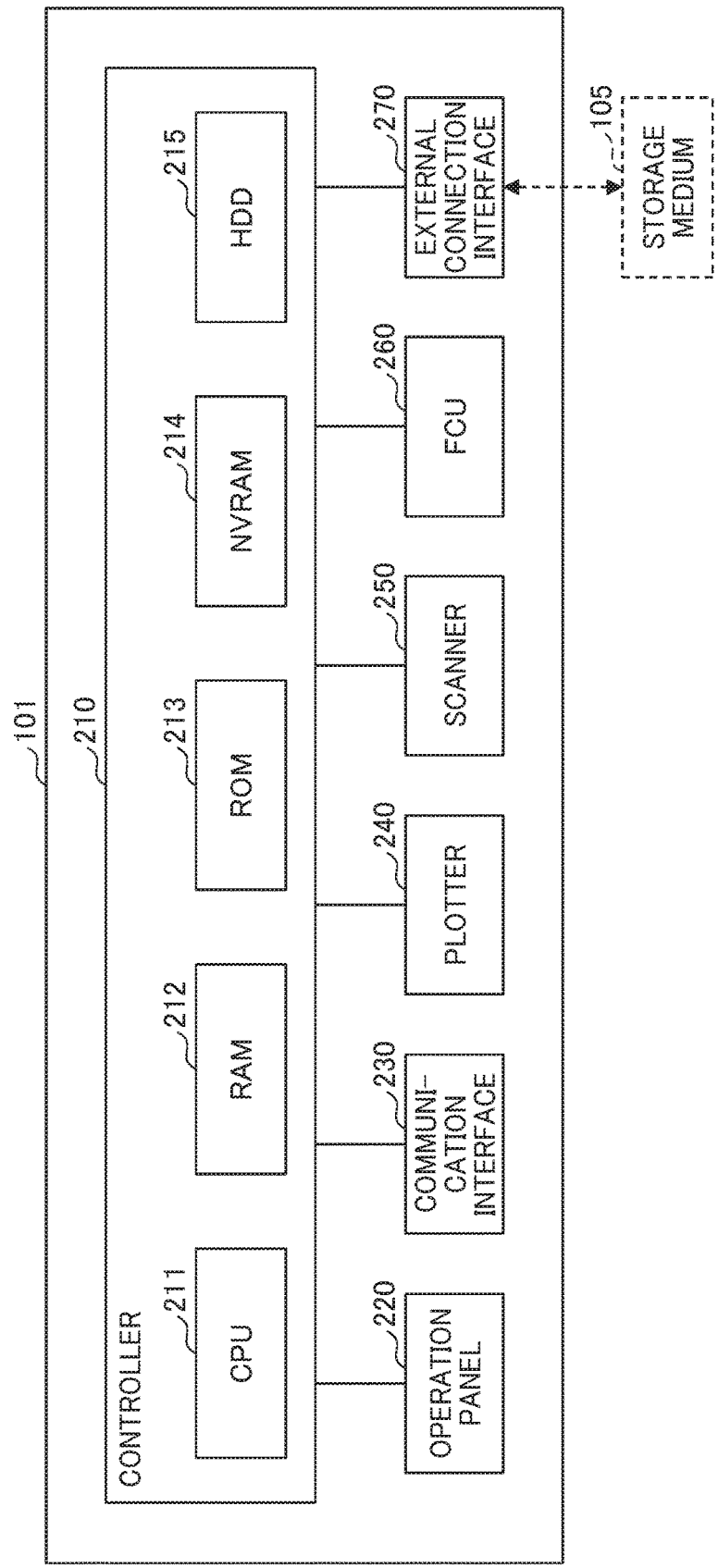

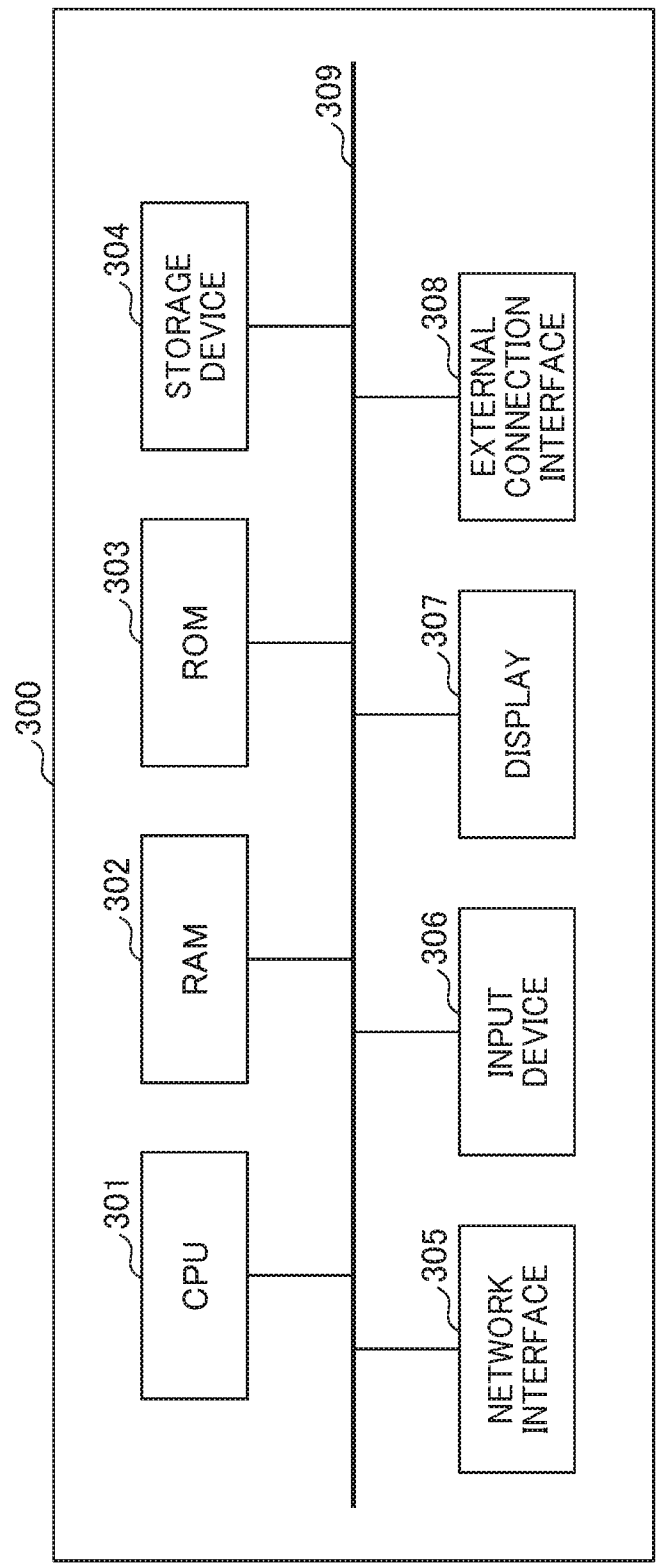

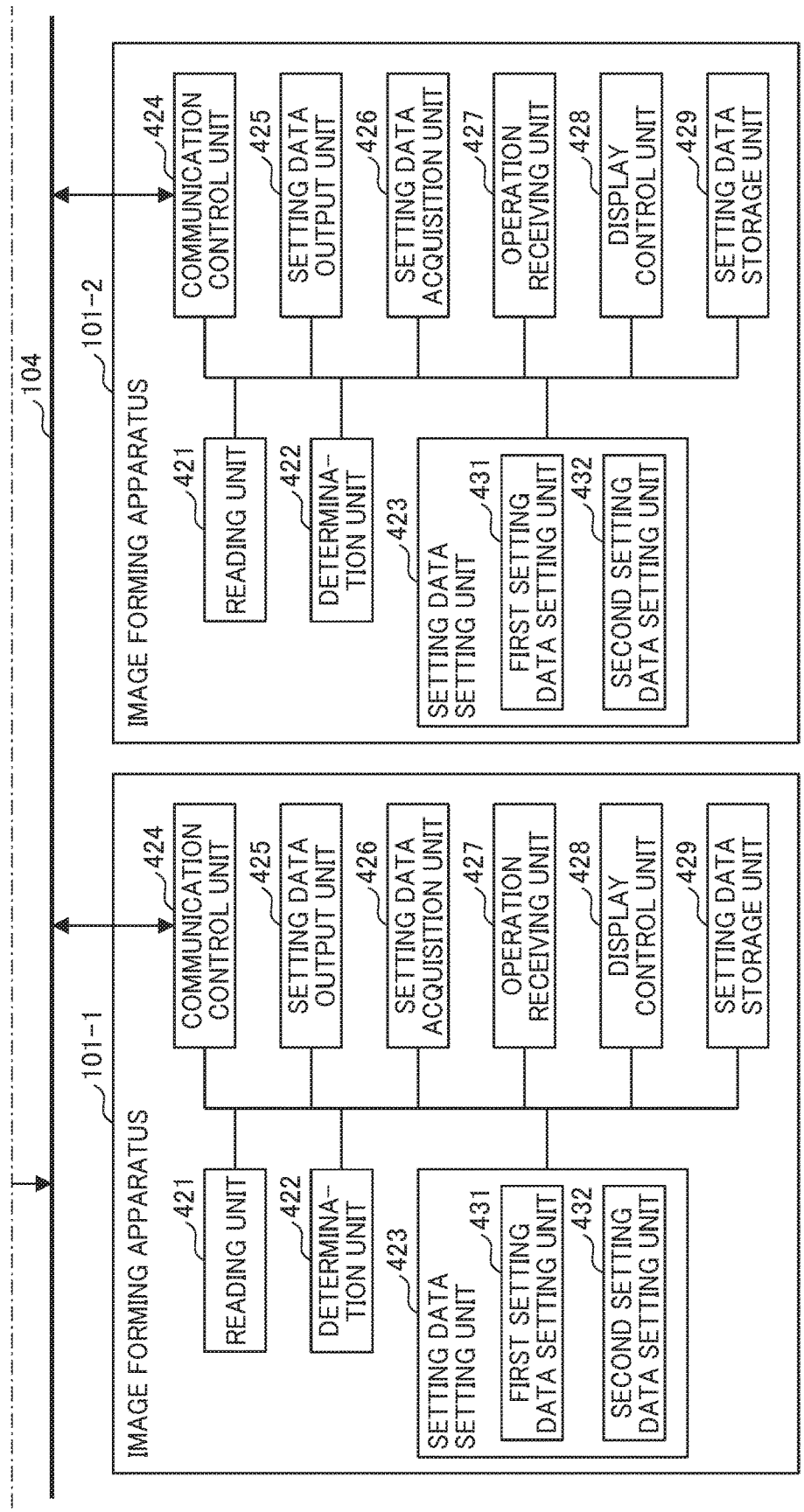

FIG. 6A
| DATA ID | OFFSET | LENGTH | ... |
|---|---|---|---|
| ID002 | 3 | 3 | ... |
| ID005 | 7 | 4 | ... |
| ... | ... | ... | ... |
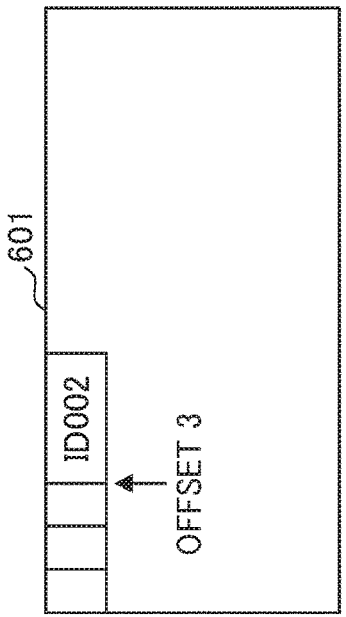
FIG. 6B
FIG. 6C
| DATA ID | OFFSET | LENGTH | ... |
|---|---|---|---|
| ID002 | 5 | 3 | ... |
| ID005 | 9 | 4 | ... |
| ... | ... | ... | ... |
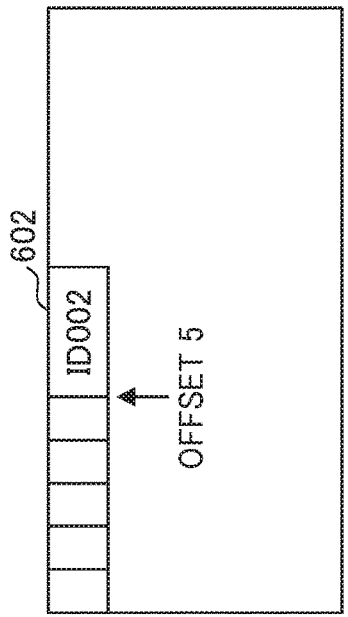
FIG. 6D

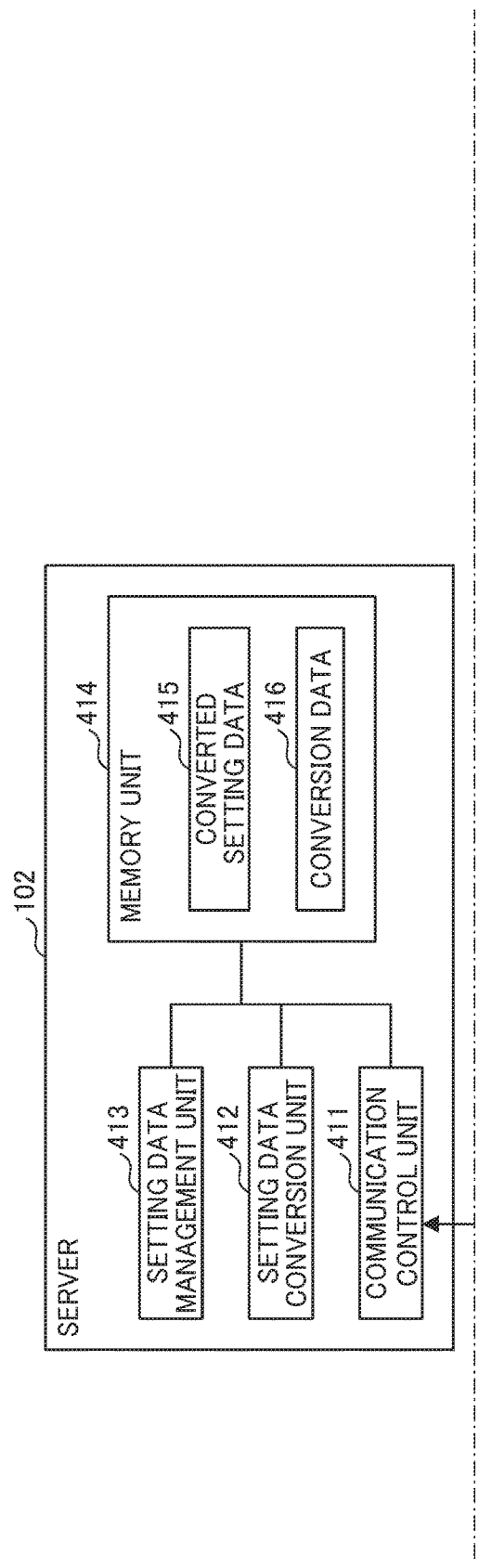

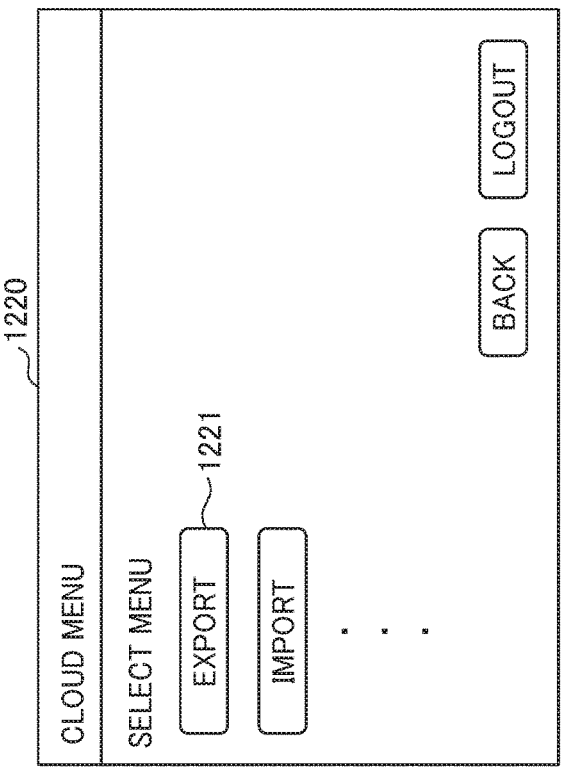
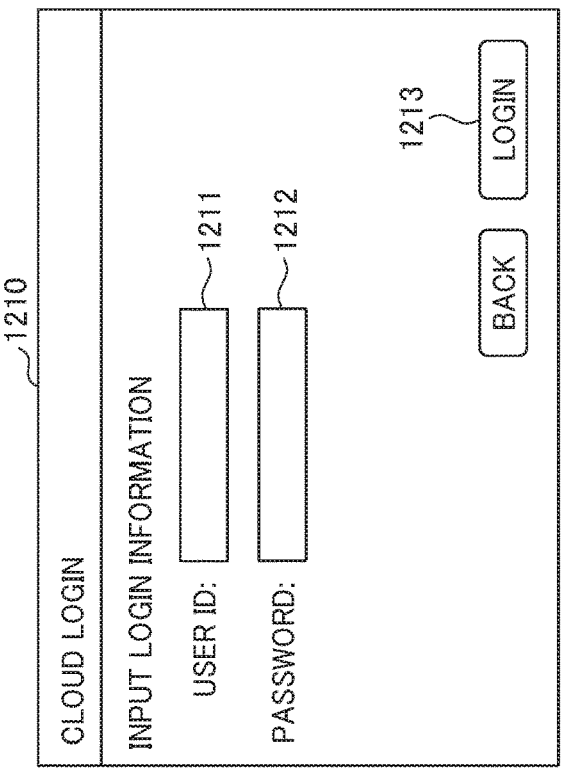
FIG. 12A
FIG. 12B

IMAGE FORMING APPARATUS, INFORMATION PROCESSING SYSTEM, AND METHOD FOR CONFIGURING IMAGE FORMING APPARATUS

CROSS-REFERENCE TO RELATED APPLICATIONS

This patent application is based on and claims priority pursuant to 35 U.S.C. § 119(a) to Japanese Patent Application No. 2017-108696, filed on May 31, 2017, in the Japan Patent Office, the entire disclosure of which is hereby incorporated by reference herein.

BACKGROUND

Technical Field

The present disclosure relates to an image forming apparatus, an information processing system, and a method for configuring the image forming apparatus.

Background Art

Systems that configure an image forming apparatus using setting data collected from another image forming apparatus are widely known. In such systems, the setting data of one image forming apparatus is exported to a server or recording medium, and another image forming apparatus is configured using the exported setting data.

An example of such a system converts the setting data of an image forming apparatus, which is subject to replacement with a new image forming apparatus, into the setting data for the new image forming apparatus. The conversion is performed using a server, and the new image forming apparatus is configured with the converted setting data.

SUMMARY

Embodiments of the present disclosure described herein provide an image forming apparatus, an information processing system, and a method for configuring the image forming apparatus. The image forming apparatus includes circuitry configured to read setting data stored in a storage medium, determine whether the read setting data is first setting data available for another image forming apparatus or second setting data available for the image forming apparatus, configure the image forming apparatus using the second setting data, based on a determination that the read setting data is the second setting data, and configure the image forming apparatus using the first setting data, based on a determination that the read setting data is the first setting data and the another image forming apparatus is the same as the image forming apparatus. The information processing system includes the image forming apparatus and an information processing apparatus. The method includes reading setting data stored in a storage medium, determining whether the read setting data is first setting data of another image forming apparatus or second setting data of the image forming apparatus, and configuring the image forming apparatus using the first setting data, when the another image forming apparatus is the same as the image forming apparatus. When the determining determines that the read setting data is the second setting data, the method further comprising configuring the image forming apparatus using the second setting data. When the determining determines that the read setting data is the first setting data, the method further comprising determining whether the another image forming apparatus is same as the image forming apparatus.

BRIEF DESCRIPTION OF THE DRAWINGS

A more complete appreciation of the embodiments and many of the attendant advantages and features thereof can be readily obtained and understood from the following detailed description with reference to the accompanying drawings.

FIG. 2 is a diagram illustrating a hardware configuration of an image forming apparatus according to an embodiment of the present disclosure.

FIG. 3 is a block diagram illustrating a hardware configuration of a computer according to an embodiment of the present disclosure.

FIG. 4A and FIG. 4B are diagrams each illustrating a functional configuration of an information processing system according to the first embodiment.

FIG. 6A to FIG. 6D are diagrams each illustrating conversion of setting data according to the first embodiment.

FIG. 8A and FIG. 8B are diagrams each illustrating a functional configuration of an information processing system according to the second embodiment.

FIG. 12A to FIG. 12D are diagrams each illustrating a display image of an image forming apparatus according to an embodiment of the present disclosure.

Figure 1:
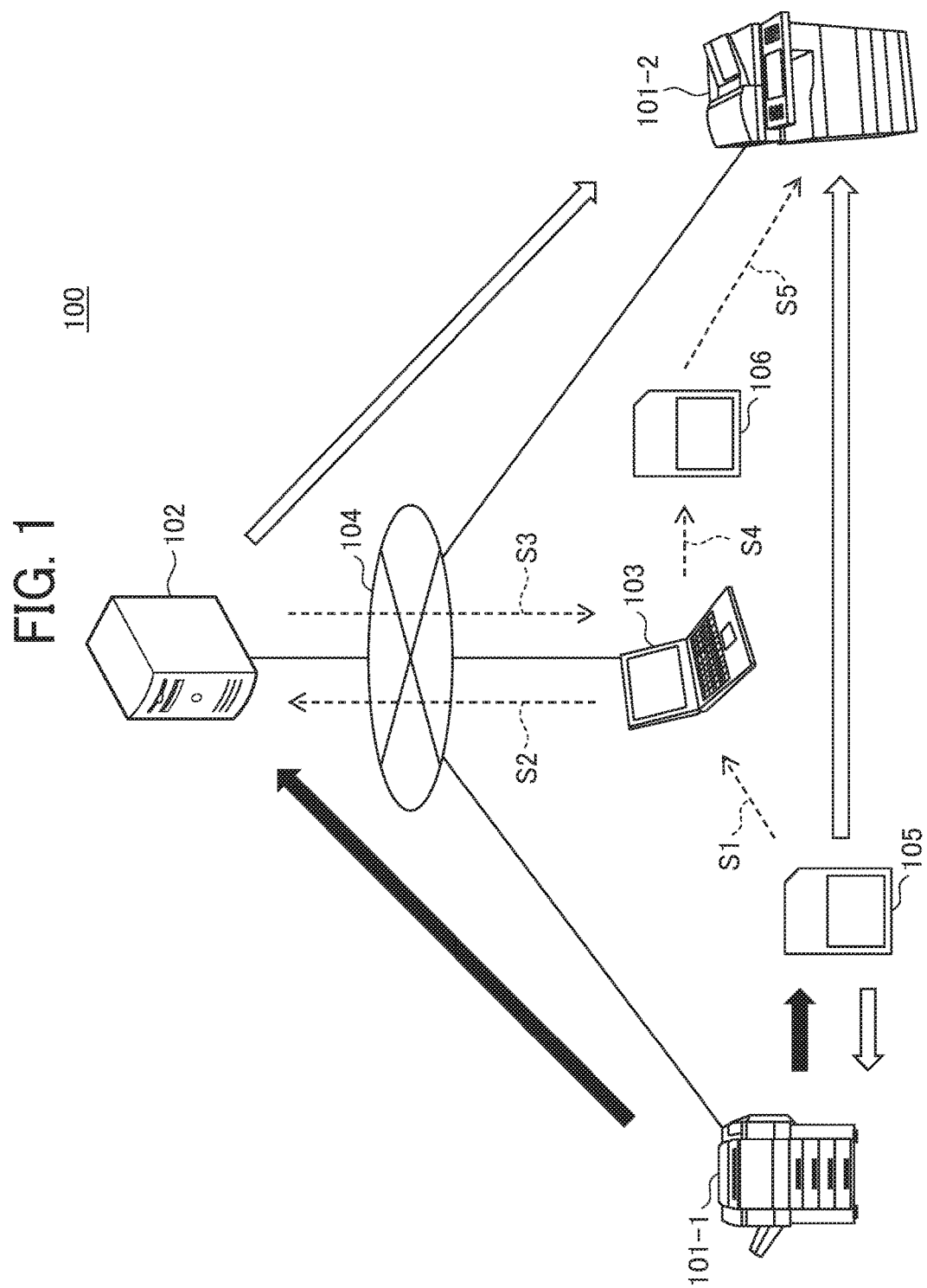
FIG. 1 is a diagram illustrating an information processing system according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. Embodiments of the present disclosure are described below with reference to the drawings.

FIG. 1 is a diagram illustrating a configuration of an information processing system according to an embodiment of the present disclosure. The information processing system 100 includes, for example, image forming apparatuses 101-1, and 101-2, and server 102, which are connected to a network 104 such as the Internet or a local area network (LAN). Hereinafter, any desired one of the image forming apparatuses 101-1 and 101-2 may be referred to as the image forming apparatus 101, unless distinction between the image forming apparatuses 101-1 and 101-2 is not needed.

The image forming apparatus 101 is a multifunction peripheral (MFP) including image processing functions such as a photocopying function, a scanning function, a printing function, or a facsimile function, which are installed in a single housing. Alternatively, the image forming apparatus 101 is an electronic apparatus such as a printer, a scanner, or a photocopier having an image forming function.

The server (information processing apparatus) 102 is an information processing apparatus such as a personal computer (PC) or a system including a plurality of information processing apparatuses. For example, the server 102 has a function to convert the first setting data extracted from the image forming apparatus 101-1 (counterpart image forming apparatus) into second setting data available for the image forming apparatus 101-2 (image forming apparatus).

The above configuration of the information processing system 100 enables the server 102 to convert the first setting data extracted from the image forming apparatus 101-1 into second setting data available for the image forming apparatus 101-2. In addition, the information processing system 100 can transfer the setting data of image forming apparatus 101-1 to the image forming apparatus 101-2 by importing the second setting data converted by the server 102 to the image forming apparatus 101-2.

There are mainly two methods for transferring the first setting data extracted from the image forming apparatus 101-1 to the image forming apparatus 101-2 in the information processing system 100 illustrated in FIG. 1.

The first method is to export the first setting data from the image forming apparatus 101-1 to the server 102 through the network 104, and import the second setting data converted by the server 102 to the image forming apparatus 101-2.

The second method is to use a storage medium such as a memory card to transfer the setting data from image forming apparatus 101-1 to the image forming apparatus 101-2. However, with the existing technology, it is not easy to transfer the setting data from the image forming apparatus 101-1 to the image forming apparatus 101-2 using a storage medium such as a memory card.

For example, a user controls the information terminal 103, which is installed with an application program for the information processing system 100 to read the first setting data extracted from the image forming apparatus 101-1 and stored in the storage medium 105. (step S1 in FIG. 1)

Additionally, the user uses the application program and uploads the stored first setting data to the server 102, and sends a command to the server 102 to convert the first setting data into the second setting data available for image forming apparatus 101-2 (step S2).

Furthermore, the user uses the application program and downloads the second setting data converted by the server 102 (step S3), and stores the downloaded second setting data in the storage medium 105 (step S4).

The user imports the second setting data stored in the storage medium 105 to the image forming apparatus 101-2 and enables the first setting data extracted from the image forming apparatus 101-1 in the image forming apparatus 101-2.

However, this method requires the information terminal 103 to be installed with the application program, and a user who is familiar with the operation of setting data conversion is required. Therefore, it is not easy to set the first setting data of the image forming apparatus 101-1 in the image forming apparatus 101-2.

In order to handle such a situation, in the present embodiment, the storage medium 105 stored with the first setting data of the image forming apparatus 101-1 is used to facilitate the setting of the setting data in the image forming apparatus 101-2.

For example, when the image forming apparatus 101-2 detects a storage medium connected, the image forming apparatus 101-2 determines whether the setting data stored in the storage medium is the second setting data converted by the server 102, or the first setting data that is not yet converted by the server 102.

If the setting data stored in the storage medium is the second setting data, the image forming apparatus 101-2 overwrites the setting data of the image forming apparatus 101-2 with the second setting data stored in the storage medium.

If the setting data stored in the storage medium is the first setting data, and the image forming apparatuses 101-1 and 101-2 are the same image forming apparatuses, the image forming apparatus 101-2 overwrites the setting data of the image forming apparatus 101-2 with the second setting data stored in the storage medium. This is because when the image forming apparatuses 101-1 and 101-2 are the same image forming apparatuses, conversion of the setting data by the server 102 is not necessary. In this disclosure, it is determined that the image forming apparatuses are the same, when the image forming apparatuses are capable of interpreting data in the same format such as when the image forming apparatuses are of the same model or the image forming apparatuses are the same apparatus as described below.

When image forming apparatus 101-2 detects first setting data stored in the storage medium, and the image forming apparatuses 101-1 and 101-2 are different image forming apparatuses, it is desired that the image forming apparatus 101-2 obtains the second setting data from the server 102 using the first setting data.

For example, when the image forming apparatus 101-1 exports the first setting data to the storage medium 105, the image forming apparatus 101-1 also exports the first setting data to the server 102. In addition, the server 102 converts the first setting data exported from the image forming apparatus 101-1, into the second setting data available for the image forming apparatus 101-2, and stores the second setting data.

Further, specific information to identify the setting data, such as device identification information to identify the image forming apparatus 101-1 and the export time of the first setting data is included in the first setting data exported from the image forming apparatus 101-1. Note that the device identification information to identify the image forming apparatus 101-1 and the export time of the first setting data are examples of the specific information. Specific information may be identification information to identify the setting data.

Accordingly, the image forming apparatus 101-2 is able to identify and import the second setting data stored in the server 102, based on the first setting data stored in the storage medium 105.

As described above, according to the present embodiment, the setting data of the image forming apparatus 101 can be set without difficulty in a system to import the setting data converted by the server 102, using the storage medium 105 storing unconverted setting data.

<Hardware Configuration>

FIG. 2 is a diagram illustrating a hardware configuration of the image forming apparatus 101 according to the present embodiment.

The image forming apparatus 101 includes a controller 210, an operation panel 220, a communication interface 230, a plotter 240, a scanner 250, a facsimile control unit (FCU) 260, and an external connection interface 270.

The controller 210 includes a central processing unit (CPU) 211, a random access memory (RAM) 212, a read only memory (ROM) 213, a non-volatile random access memory (NVRAM) 214, and a hard disk drive (HDD) 215.

The CPU 211 reads, for example, a program, data, and setting data from, for example, the ROM 213, the NVRAM 214, and the HDD 215, and executes processing to control the image forming apparatus 101 and implement each function of the image forming apparatus 101. The RAM 212 is a volatile memory to be used as, for example, a work area for the CPU 211. The ROM 213 is a non-volatile storage device that stores various kinds of programs and data.

The NVRAM 214 is a writable non-volatile storage device that stores, for example, the setting data of the image forming apparatus 101. The HDD 315 is a storage device that stores various kinds of programs and data.

The control panel 220 includes an input unit that accepts a user input, and a display unit that displays various types of information. Further, the operation panel 220 may be an information processing apparatus that has the configuration of a general-purpose computer.

The communication interface 230 is a network interface that connects the image forming apparatus 101 to the network 104. The image forming apparatus 101 communicates with the server 102, through the communication interface 230.

The plotter 240 is a printing device that prints out print data. The scanner 250 is a reading device or a scanner that scans a document or the like. The FCU 260 transmits and receives facsimile data.

The external connection interface 270 is an interface circuit such as a universal serial bus (USB) to connect various external devices. The external device includes, for example, a storage medium 105.

The server 102 and the information terminal 103 as illustrated in FIG. 1 have the configuration of a general-purpose computer. The hardware configuration of such a general-purpose computer is described below.

FIG. 3 is a diagram illustrating a hardware configuration of the computer according to the present embodiment.

The computer 300 includes, for example, a CPU 301, a RAM 302, a ROM 303 a storage device 304, a network interface 305, an input device 306, a display 307, an external connection interface 308, and a bus 309.

The CPU 301 reads programs and data from the ROM 303 and the storage device 304 into the RAM 302, and executes processing to implement each function of the computer 300. The RAM 302 is a volatile memory to be used as a work area for the CPU 301. The ROM 303 is a non-volatile memory that can hold the programs and the data even after having been turned off and back on.

The storage device 304 is a mass storage device such as an HDD and a solid state drive (SSD), and stores, for example, an operating system (OS), an application program and various types of data. The network interface 305 is a communication interface that connects the computer 300 to the network 104.

The input device 306 includes a pointing device such as a mouse, and an input device such as a key board and these devices are used to input operation signals into the computer 300. The display 307 displays, for example, the results of processing performed by the computer 300.

The external connection interface 308 is an interface circuit to connect various external devices such as a USB. The bus 309 is connected to each of the above-mentioned components and transfers address signals, data signals, and various types of control signals.

First Embodiment

Figure 4A:
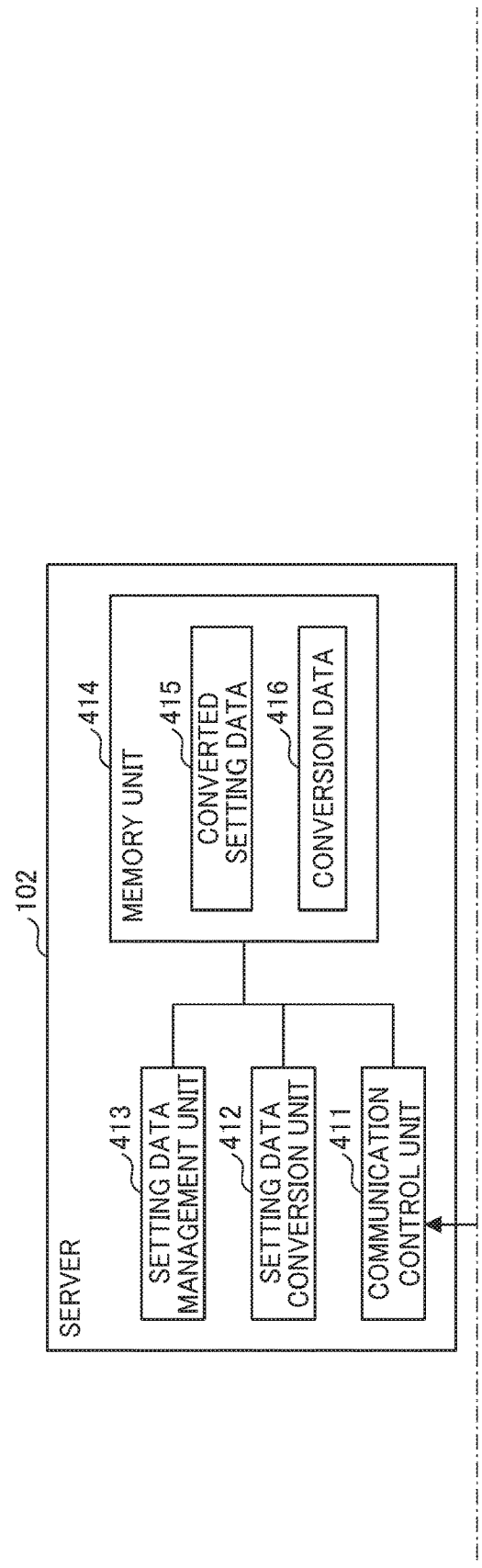

FIG. 4A and FIG. 4B are diagrams each illustrating a functional configuration of the information processing system 100 according to the first embodiment.

The information processing system 100 includes the image forming apparatuses 101-1, 101-2, and the server 102, which are communicably connected to each other through the network 104.

As illustrated in FIG. 4A and FIG. 4B, the image forming apparatuses 101-1 and 101-2 have a similar functional configuration. The image forming apparatuses 101-1 and 101-2 can be the same image forming apparatus or different image forming apparatuses.

The image forming apparatus 101 includes a reading unit 421, a determination unit 422, a setting data setting unit 423, a communication control unit 424, a setting data output unit 425, a setting data acquisition unit 426, an operation receiving unit 427, a display control unit 428, and a setting data storage unit 429.

For example, the reading unit 421 is implemented by a program executed by the CPU 211 illustrated in FIG. 2, and the external connection interface 270, and reads the setting data stored in the storage medium 105.

For example, the determination unit 422 is implemented by a program executed by the CPU 211 illustrated in FIG. 2, and determines whether the setting data read by the reading unit 421 is the first setting data that is not yet converted by the server 102 or the second setting data that has been converted by the server 102. For example, the determination unit 422 refers to an import conversion flag included in the header of the setting data, and determines if the setting data is the first setting data that is not yet converted by the server 102 or the second setting data that has been converted by the server 102. A detailed description of the setting data will be given later.

For example, the setting data setting unit 423 is implemented by a program executed by the CPU 211 illustrated in FIG. 2, and configures the image forming apparatus 101 according to the setting data read by the reading unit 421 and the result of determination made by the determination unit 422. The setting data setting unit 423 includes, for example, the first setting data setting unit 431 and the second setting data setting unit 432. The first setting data setting unit 431 and the second setting data setting unit 432 can be the same setting data setting unit.

When the setting data read by the reading unit 421 is the second setting data converted by the server 102, the first setting data setting unit 431 configures the image forming apparatus 101 using the second setting data. For example, the first setting data setting unit 431 reflects the setting to the image forming apparatus 101, by controlling the setting data storage unit 429 which stores the setting data of the image forming apparatus 101 to store the second setting data read by the reading unit 421.

The second setting data setting unit 432 configures the image forming apparatus 101 when the setting data read by the reading unit 421 is the first setting data that is not yet converted by the server 102 and the first setting data is exported from the image forming apparatus 101 itself. For example, the second setting data setting unit 432 reflects the setting to the image forming apparatus 101, by controlling the setting data storage unit 429 which stores the setting data of the image forming apparatus 101 to store the first setting data read by the reading unit 421.

The communication control unit 424 is implemented, for example, by a program executed by the CPU 211 illustrated in FIG. 2, and controls the protocol used to communicate with the server 102, or executes processes necessary for communication such as user authentication processes.

The setting data output unit 425 is implemented, for example, by a program executed by the CPU 211 illustrated in FIG. 2, and exports the setting data of the image forming apparatus 101 to the storage medium 105 or the server 102.

The setting data acquisition unit 426 is implemented, for example, by a program executed by the CPU 211 illustrated in FIG. 2, and obtains the converted second setting data from the server 102.

The operation receiving unit 427 is implemented, for example, by a program executed by the CPU 211 illustrated in FIG. 2, and accepts user's operation through the operation panel 220.

The display control unit 428 is implemented, for example, by a program executed by the CPU 211 illustrated in FIG. 2, and controls, for example, the operation panel 220 to display a display screen.

The setting data storage unit 429 is implemented, for example, by a program executed by the CPU 211 illustrated in FIG. 2, and the NVRAM 214, and stores the setting data of the image forming apparatus 101.

The server 102 includes, for example, a communication control unit 411, a setting data conversion unit 412, a setting data management unit 413, and a memory unit 414.

The communication control unit 411 is implemented, for example, by a program executed by the CPU 301 illustrated in FIG. 3 and the network interface 305. The communication control unit 424 controls the protocol used to communicate with the image forming apparatus 101, or executes processes necessary for communication such as user authentication processes.

The setting data conversion unit 412 is implemented, for example, by a program executed by the CPU 301 illustrated in FIG. 3, and converts the first setting data exported from the image forming apparatus 101-1 into the second setting data available for the image forming apparatus 101-2. A detailed description of the setting data and a method for converting the setting data will be given later.

The setting data management unit 413 is implemented, for example, by a program executed by the CPU 301 illustrated in FIG. 3, and stores the setting data 415 converted by the setting data conversion unit 412 into the memory unit 414. For example, the setting data management unit 413 provides the image forming apparatus 101 with the converted setting data 415 stored in the memory unit 414, in response to a request from the image forming apparatus 101.

The memory unit 414 is implemented for example, by a program executed by the CPU 301 illustrated in FIG. 3, the storage device 304, and the RAM 302. The memory unit 414 stores, for example, the data such as the aforementioned converted setting data 415 and the conversion data 416 that the setting data conversion unit 412 uses to convert the setting data.

Figure 5B:
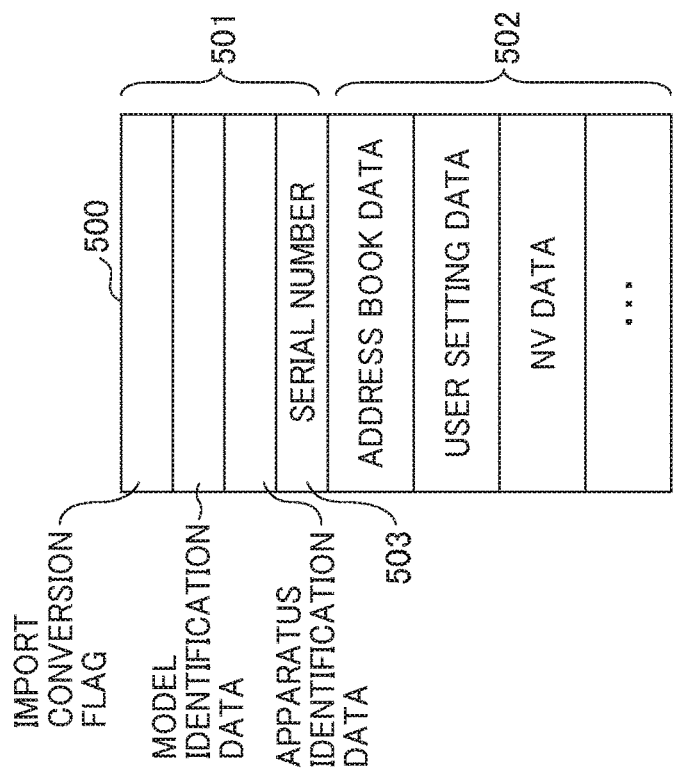
FIG. 5A and FIG. 5B are diagrams each illustrating setting data according to the first embodiment.
Figure 5A:
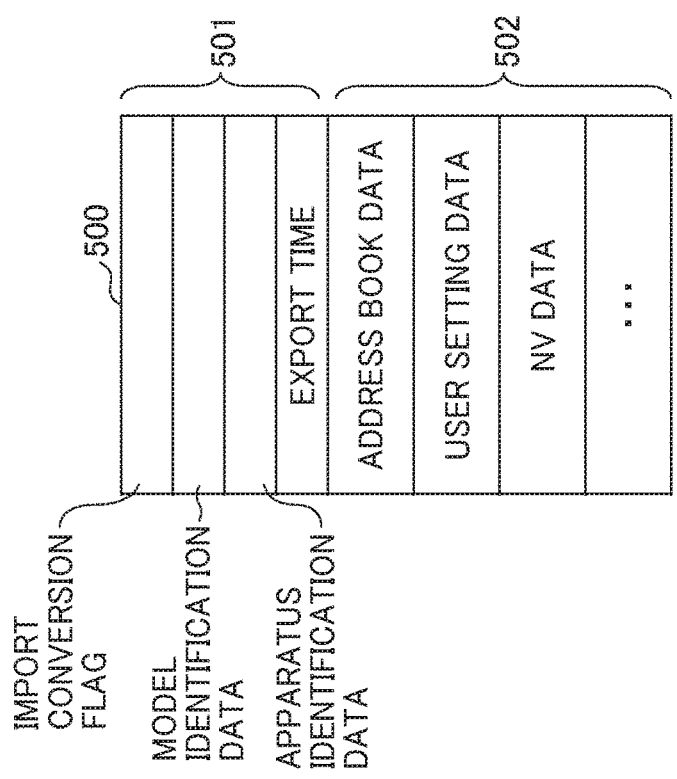

FIG. 5A and FIG. 5B are block diagrams each illustrating an example setting data according to the first embodiment.

The setting data 500 is the data related to the setting of the image forming apparatus 101 and includes a header section 501 and a data section 502 as illustrated in FIG. 5A and FIG. 5B.

FIG. 5A is a diagram illustrating an example of the setting data. The header section 501 in the example illustrated in FIG. 5A includes an import conversion flag, model identification data, apparatus identification data, and an export time.

The import conversion flag indicates whether the setting data 500 is the first setting data that is not yet converted by the server 102, or the second setting data that has been converted by the server 102. For example, when the setting data 500 is the second setting data converted by the server 102, the import conversion flag is set. Accordingly, the determination unit 422 of the image forming apparatus 101 can determine that the setting data is the second setting data when the flag is set, and that the setting data is the first setting data when the flag is not set.

The model identification data is data to identify the model of the image forming apparatus 101. For example, when the setting data is the first setting data, the model identification data indicates the model of the image forming apparatus 101 from which the first setting data is exported. Alternatively, the model identification data indicates the model of the image forming apparatus 101 corresponding to the second setting data when the setting data is the second setting data.

The apparatus identification data is data to identify the image forming apparatus 101. The apparatus identification data includes data unique to each one of the image forming apparatuses 101.

The export time is data that indicates when the first setting data is exported from the image forming apparatus 101. The apparatus identification data and the export time are both included in the first setting data and the second setting data, and are used, for example, as the data to identify the second setting data corresponding to the first setting data.

The data section 502 of the setting data 500 includes, for example, address book data, user setting data, and non-volatile (NV) data.

The address book data is the destination information registered, for example, by the user, such as the mail address and the facsimile number of the destination.

The user setting data is for example, the setting data registered by the user, for example, through the operation panel 220 of the image forming apparatus 101. The data format, the configurable items, and the configurable set value, may vary, depending on, for example, the model of the image forming apparatus 101. The setting data conversion unit 412 of the server 102 converts, for example, the data format, the items, and the set value of the user setting data of the image forming apparatus 101-1, into the data format, the items, and the set value which can be accepted by the image forming apparatus 101-2.

For example, the NV data is the setting data used inside the image forming apparatus 101, such as dump data of the NVRAM 214. For example, the address at which the setting data is stored or the offset differs in the NV data depending on, for example, the model of the image forming apparatus 101. The setting data conversion unit 412 of the server 102 uses the conversion data 416 stored beforehand in the memory unit 414 to convert the NV data from the image forming apparatus 101-1 into the NV data that can be accepted by the image forming apparatus 101-2.

FIG. 6A to FIG. 6D are diagrams illustrating a conversion process of the setting data according to the first embodiment.

FIG. 6A illustrates an image of the conversion data 416 of model 1 (for example, image forming apparatus 101-1). The conversion data 416 includes information such as the data ID, the offset, and the length.

The data ID is the identification information for identifying each item of data included in the NV data. The offset indicates, for example, the offset from the start address of the NVRAM 214. The length indicates the length (size) of the data corresponding to each data ID. FIG. 6A is a table illustrating an example of conversion data of model 1, where the data with data ID "ID002" is stored with offset "3" and length "3".

FIG. 6B illustrates an image of the NV data of the model 1. FIG. 6B schematically illustrates that the data with data ID "ID002" is stored at a position of offset "3" in the NV data.

FIG. 6C illustrates an image of the conversion data 416 of the model 2 (for example, image forming apparatus 101-2). FIG. 6C is a table illustrating an example of the conversion data of the model 2, where the data with data ID "ID002" is stored with offset "5" and length "3".

FIG. 6D illustrates an image of the NV data of model 2. FIG. 6D schematically illustrates that the data with data ID "ID002" is stored at a position of offset "5" in the NV data.

The setting data conversion unit 412 of the server 102 converts the NV data of the image forming apparatus 101-1 into the NV data available for the image forming apparatus 101-2, using the conversion data 416 of the image forming apparatus 101-1 and the conversion data 416 of the image forming apparatus 101-2.

FIG. 6A to FIG. 6D illustrate an example of conversion process of the setting data by the setting data conversion unit 412. The data conversion process by the setting data conversion unit 412 includes various steps of conversion to convert the NV data from the image forming apparatus 101-1 to the NV data available for the image forming apparatus 101-2.

Next, a flow of method of configuring the image forming apparatus 101 in the present embodiment is described below.

Figure 7:
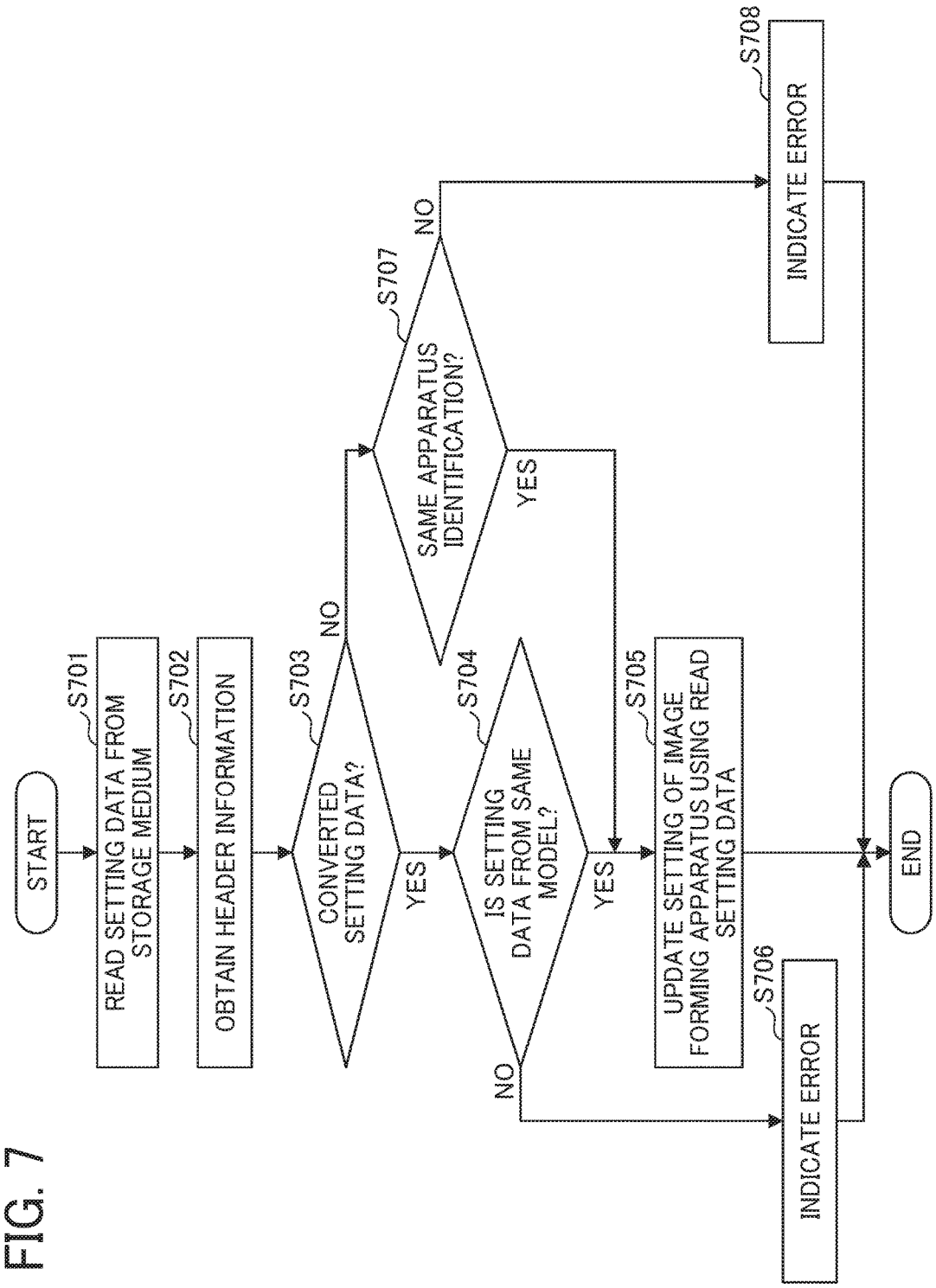
FIG. 7 is a flowchart illustrating setting processes for an image forming apparatus according to the first embodiment.

FIG. 7 is a flowchart illustrating processes of configuring an image forming apparatus according to the first embodiment.

The flow chart illustrates an example of processes of configuring the image forming apparatus 101-2, using the first setting data exported from the image forming apparatus 101-1, and stored in the storage medium 105. Note that the image forming apparatuses 101-1 and 101-2 can be the same image forming apparatus or different image forming apparatuses.

In the step S701, the reading unit 421 of the image forming apparatus 101-2 reads the setting data, for example, from the storage medium 105 such as a memory card connected to the external connection interface 270.

In the step S702, the determination unit 422 of the image forming apparatus 101-2 obtains the header data (header section 501) from the setting data read by the reading unit 421.

In the step S703, the determination unit 422 refers to the import conversion flag of the header section 501, and determines whether the setting data read by the reading unit 421 is the first setting data that is not yet converted by the sever 102, or the second setting data that is converted by the server 102.

If the setting data that is read by the reading unit 421 is the converted second setting data ("YES" in the step S703), the determination unit 422 advances the process to the step S704. When the setting data that is read by the reading unit 421 is the first setting data that has not yet converted ("NO" in the step S703), the determination unit 422 advances the process to the step S707.

In the step S704, the determination unit 422 of the image forming apparatus 101-2 determines whether the second setting data read by the reading unit 421 is of the same model as the image forming apparatus 101-2.

If the setting data that is read by the reading unit 421 is of the same model as the image forming apparatus 101-2 ("YES" in the step S704), the determination unit 422 advances the process to the next step S705. When the setting data that is read by the reading unit 421 is not of the same model as the image forming apparatus 101-2 ("NO" in the step S704), the determination unit 422 advances the process to the step S706.

When the process proceeds from the step S704 to the step S705, the first setting data setting unit 431 of the image forming apparatus 101-2 updates the setting of the image forming apparatus 101-2 using the setting data (second setting data) read by the reading unit 421.

In the step S706, the display control unit 428 of the image forming apparatus 101-2 displays, for example, an error screen indicating that the setting data cannot be imported, on the operation panel 220, and terminates the process.

On the other hand, when the process proceeds from the step S703 to the step S707, the determination unit 422 of the image forming apparatus 101-2 determines whether the apparatus identification data included in the first setting data read by the reading unit 421 is the same as its own apparatus identification data.

If the apparatus identification data included in the first setting data read by the reading unit 421 is the same as its own apparatus identification data ("YES" in the step S707), the determination unit 422 advances the process to the step S705. On the other hand, when the apparatus identification data is not the same as its own apparatus identification data ("NO" in the step S707), the determination unit 422 advances the process to the step S708.

When the process proceeds from the step S707 to the step S705, the second setting data setting unit 432 of the image forming apparatus 101-2 updates the setting of the image forming apparatus 101-2 using the setting data (first setting data) read by the reading unit 421.

In the step S708, the display control unit 428 of the image forming apparatus 101-2 displays, for example, the error screen indicating that the setting data cannot be imported on the operation panel 220, and terminates the process.

With the above processes, the image forming apparatus 101-2 can update the setting of the image forming apparatus 101-2 using the setting data stored in the storage medium 105, when the first setting data exported by itself is stored in the storage medium 105.

As described above, according to the present embodiment, the setting data of the image forming apparatus 101 can be set without difficulty, using the storage medium 105 storing unconverted setting data, in a system that imports the setting data converted by the server 102 to the image forming apparatus 101.

Second Embodiment

In the second embodiment, an example of the process when the setting data stored in the storage medium 105 is the first setting data that is not converted by the server 102, and the image forming apparatus 101-1 that has exported the first setting data is not the image forming apparatus 101-1 is described.

Figure 8B:
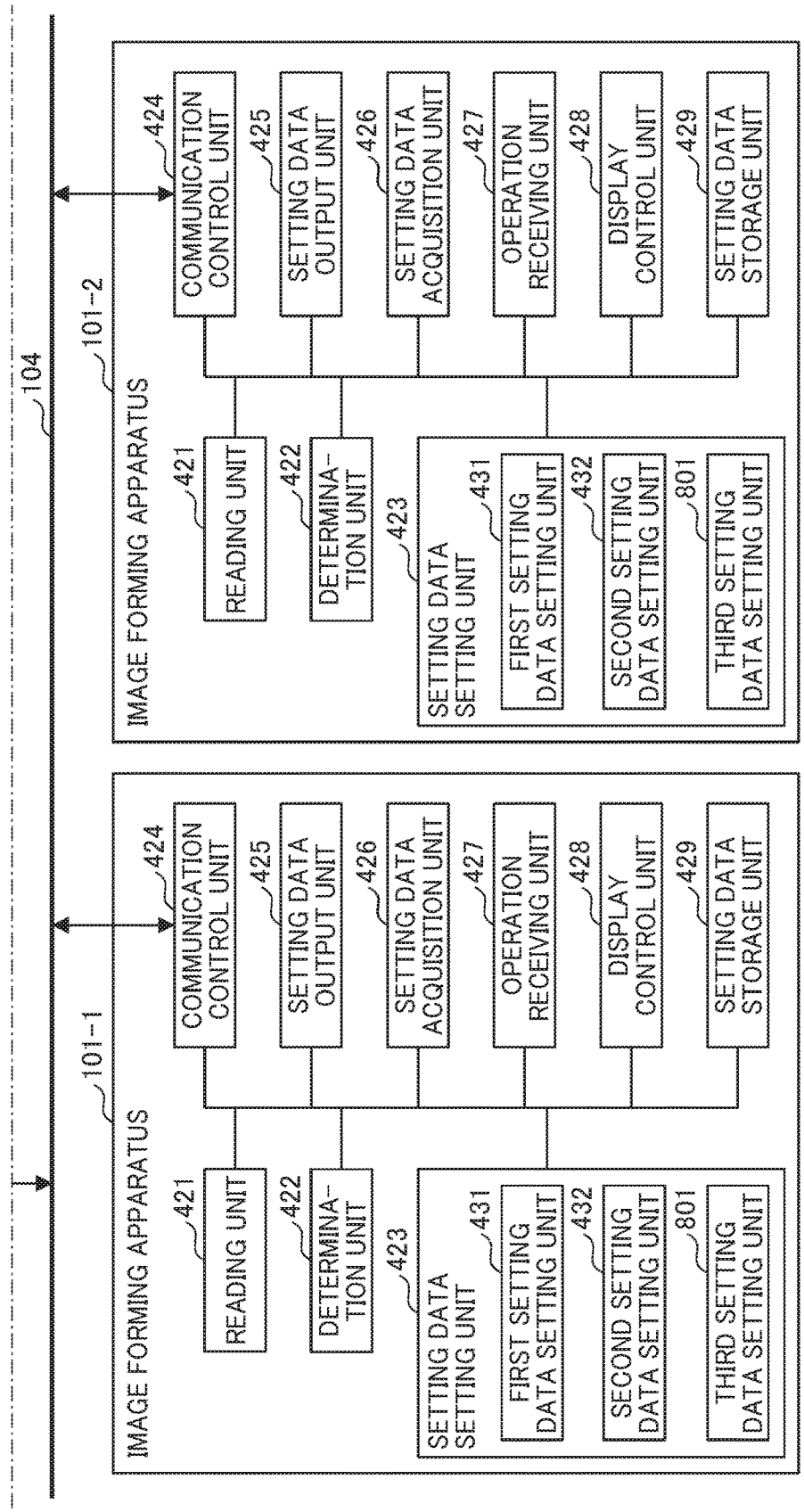

FIG. 8A and FIG. 8B are diagrams illustrating a functional configuration of the information processing system 100 according to the second embodiment. As illustrated in FIG. 8A and FIG. 8B, the image forming apparatus 101 in the second embodiment includes a third setting data setting unit 801, in addition to the functional configuration of the image forming apparatus 101 according to the first embodiment as illustrated in FIG. 4A and FIG. 4B. The functional configuration of the information processing system 100 according to the second embodiment which is the same as that of the first embodiment illustrated in FIG. 4A and FIG. 4B is not described below, and mainly the difference is described.

When the setting data output unit 425 of the image forming apparatus 101-1 exports the first setting data of the image forming apparatus 101-1 to the storage medium 105, the first setting data is also exported to the server 102.

The setting data conversion unit 412 of the server 102 converts the first setting data exported from the image forming apparatus 101-1 into the second setting data available for the image forming apparatus 101-2.

The setting data management unit 413 of the server 102 stores the second setting data converted by the setting data conversion unit 412 in the memory unit 414, and provides the image forming apparatus 101-2 with the converted second setting data in response to a request from the image forming apparatus 101-2.

The setting data acquisition unit 426 of the image forming apparatus 101-2 obtains the second setting data from the server 102, when the setting data that the reading unit 421 has read from the storage medium 105 is the first setting data, and the first setting data is not the data that is exported from the aforementioned image forming apparatus 101-2.

For example, the setting data acquisition unit 426 of the image forming apparatus 101-2 obtains the export time from the head section 501 of the first setting data read by the reading unit 421. The setting data acquisition unit 426 obtains the second setting data of the same model as the image forming apparatus 101-2 including the export time, from the second setting data stored in the memory unit 414 of the server 102.

The third setting data setting unit 801 of the image forming apparatus 101-2 updates the setting of the image forming apparatus 101-2 using the second setting data of the matching model and the matching export time obtained by the setting data acquisition unit 426.

Alternatively, the setting data acquisition unit 426 of the image forming apparatus 101-2 may display, on the operation panel 220, the second setting data of the same model of the image forming apparatus 101-2, as an available option, from the second setting data stored in the memory unit 414 of the server 102. In this case, the setting data acquisition unit 426 obtains the second setting data of the user's selection from the server 102, and the third setting data setting unit 801 updates the setting of the image forming apparatus 101-2 using the second setting data obtained by the setting data acquisition unit 426. The third setting data setting unit 801 can be the same setting data setting unit as the first setting data setting unit 431 or the second setting data setting unit 432, or a setting data setting unit different from the first setting data setting unit 431 or the second setting data setting unit 432.

Figure 9A:
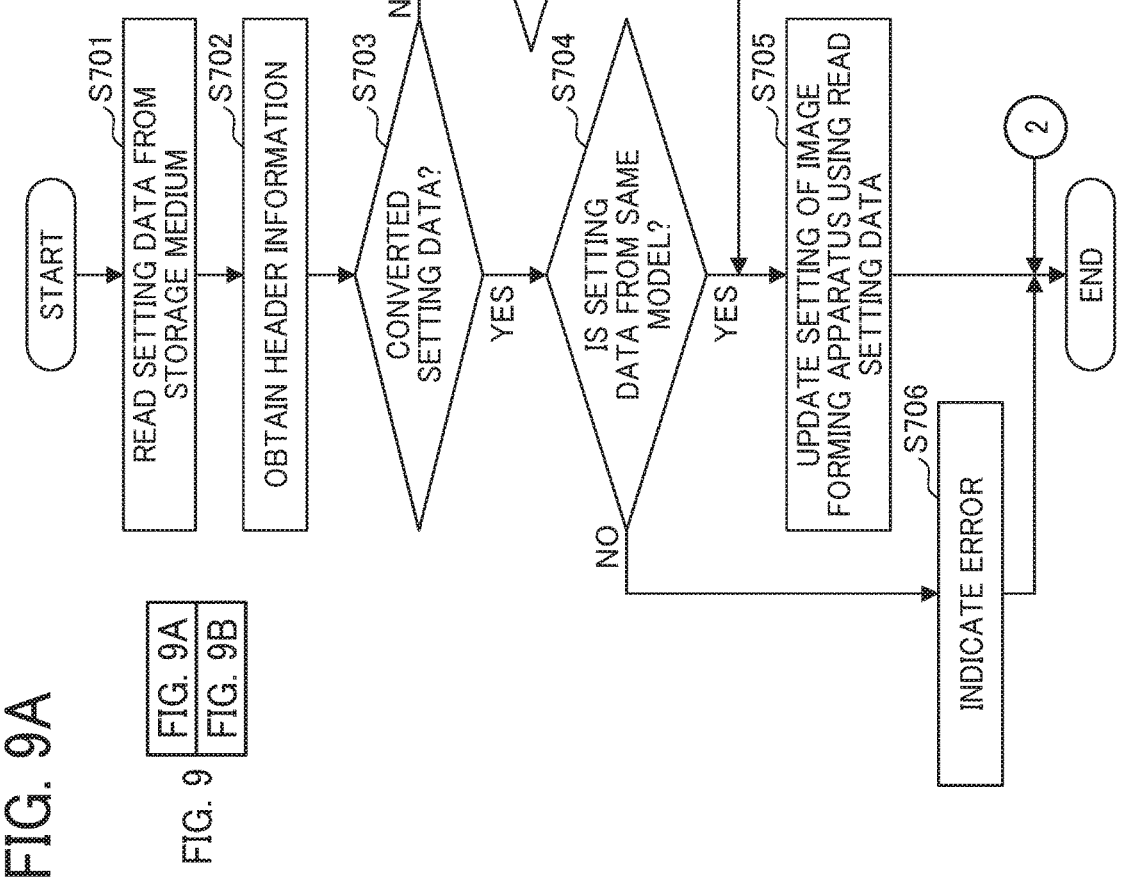
FIG. 9A and FIG. 9B are flowcharts illustrating setting processes for an image forming apparatus according to the second embodiment.
Figure 9B:
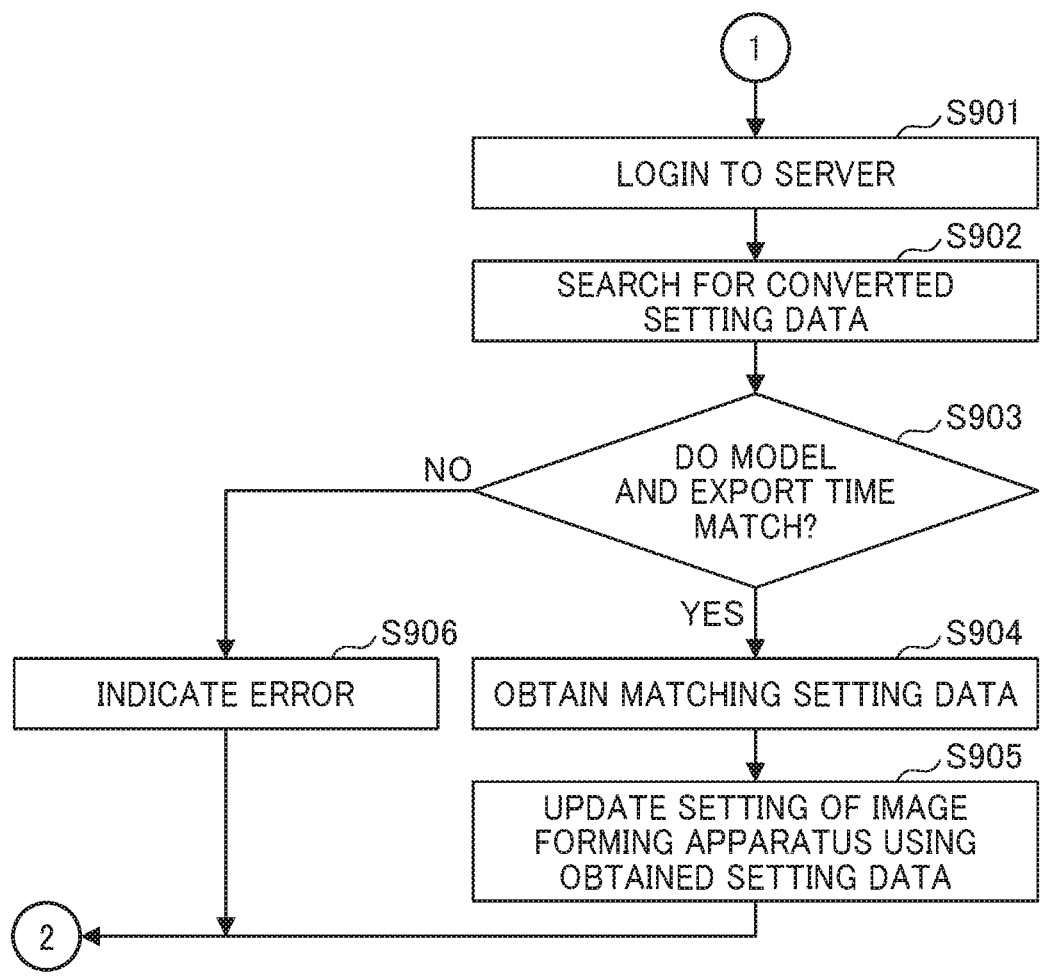

FIG. 9 (FIGS. 9A and 9B) is a flowchart of setting processes for an image forming apparatus according to the second embodiment.

The processes from the step S701 to the step S707 in FIG. 9 are the same as the processes in the first embodiment as illustrated in FIG. 7. The differences between the second embodiment and the first embodiment are described below.

When the process proceeds from the step S707 to the step S901, the setting data acquisition unit 426 of the image forming apparatus 101-2 logs into the server 102. For example, the setting data acquisition unit 426 uses the display control unit 428 to display the login screen 1210 as illustrated in FIG. 12A, and uses the login information entered by the user to log into the server 102. Note that the processes in the step S901 are optional.

In the step 902, the setting data acquisition unit 426 of the image forming apparatus 101-2 searches for the converted setting data available for the image forming apparatus 101-2, from the converted setting data (second setting data) stored in the server 102.

For example, the setting data acquisition unit 426 obtains the export time from the first setting data read by the reading unit 421. Then, the setting data acquisition unit 426 searches for the second setting data with matching model and export time, from the second setting data managed by the setting data management unit 413 of the server 102. As a specific example, the setting data acquisition unit 426 searches, from the second setting data stored in the server 102, the second setting data that has the same model identification data as the image forming apparatus 101-2 and has the export time obtained from the first setting data read by the reading unit 421.

In the step S903, the setting data acquisition unit 426 determines whether the second setting data with matching model and export time exists within the second setting data stored in the server 102.

The setting data acquisition unit 426 advances the process to the step S904 when second setting data with matching model and export time exists. On the other hand, the setting data acquisition unit 426 advances the process to the step S906 when second setting data with matching model and export time does not exist.

In the step S904, the setting data acquisition unit 426 of the image forming apparatus 101-2 obtains the second setting data with matching model and export time from the server 102.

In the step S905, the third setting data setting unit 801 of the image forming apparatus 101-2 updates the setting of the image forming apparatus 101-2, using the second setting data obtained by the setting data acquisition unit 426.

In the step S906, the display control unit 428 of the image forming apparatus 101-2 displays, for example, the error screen indicating that the setting data cannot be imported, on the operation panel 220, and terminates the process.

With the above processes, the image forming apparatus 101-2 can easily update the setting of image forming apparatus 101-2, even when the first setting data of the image forming apparatus 101-1 which is different from the image forming apparatus 101-2, is stored in the storage medium 105.

Note that in the steps S902 and S903 in FIG. 9 described above, the setting data acquisition unit 426 of the image forming apparatus 101-2 is assumed to obtain the second setting data automatically from the server 102.

Alternatively, the setting data acquisition unit 426 of the image forming apparatus 101-2 may require the user to select the to-be-obtained second setting data from the available second setting data stored in the server 102.

Figure 10:
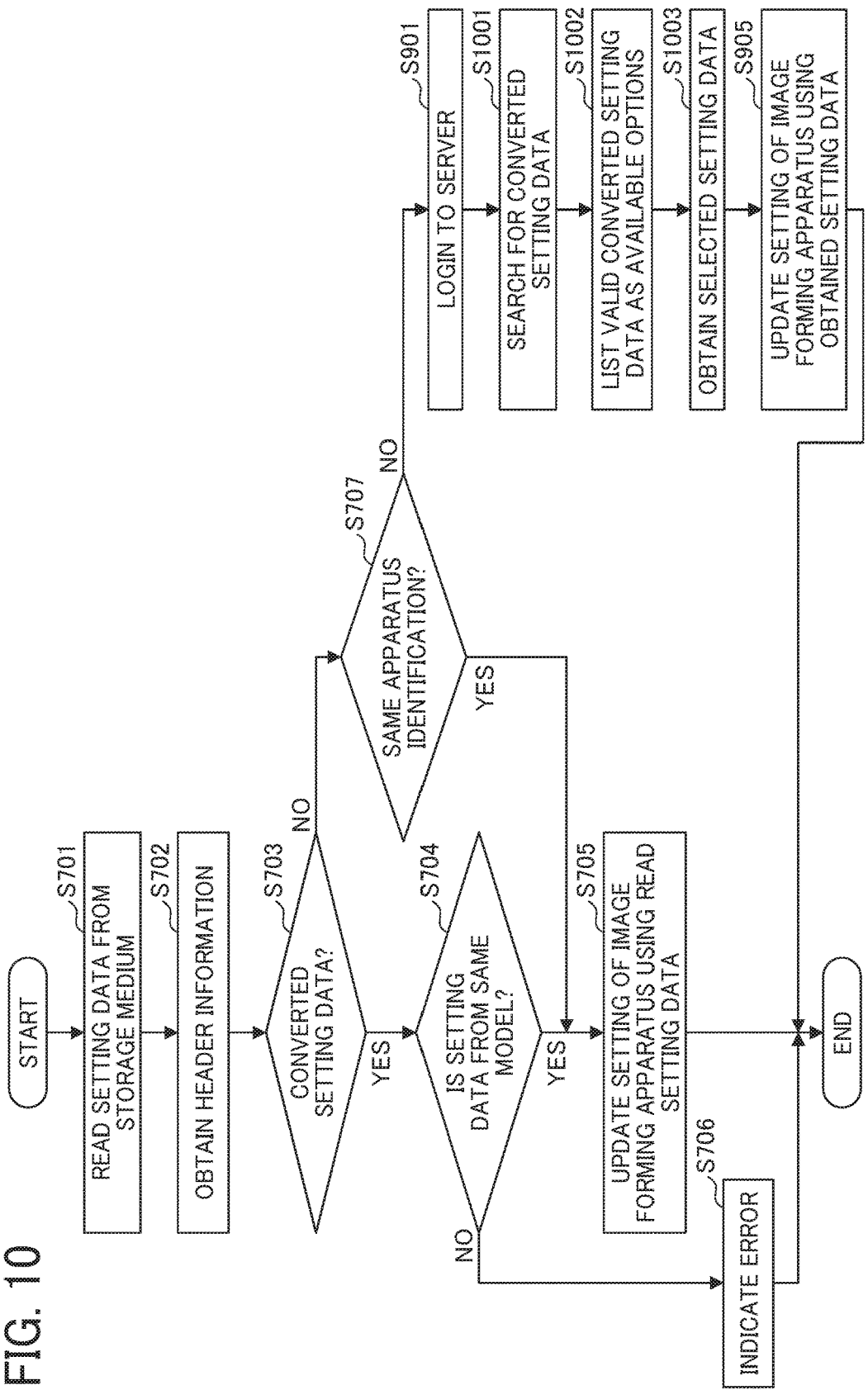
FIG. 10 is a flowchart illustrating alternative setting processes for an image forming apparatus according to the second embodiment.

FIG. 10 is a flowchart of alternative configuration processes for an image forming apparatus according to the second embodiment.

Note that the processes in steps S701 to S707, steps S901, and 905 in FIG. 10 are the same as the process illustrated in the FIG. 9, and the differences from the processes illustrated in FIG. 9 are mainly described below.

In the step S1001, the setting data acquisition unit 426 of the image forming apparatus 101-2 searches for the converted setting data (second setting data) available for the image forming apparatus 101-2, from the second setting data stored in the server 102. For example, the setting data acquisition unit 426 searches the second setting data stored in the server 102 for the second setting data including the same model identification data as the image forming apparatus 101-2.

Figure 12D:
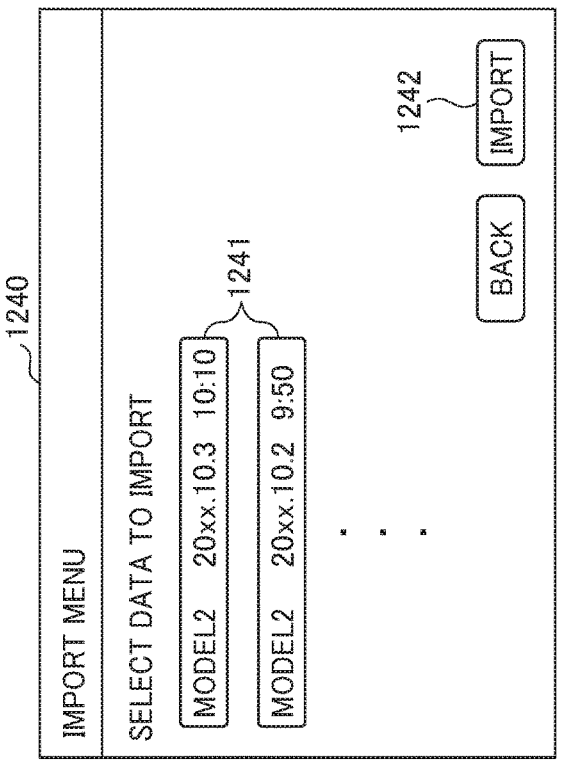

In the step S1002, the setting data acquisition unit 426 of the image forming apparatus 101-2 uses the display control unit 428 to display a list to select the converted setting data (second setting data) available for the image forming apparatus 101-2, on the operation panel 220. FIG. 12D illustrates an example of the selection screen displayed on the operation panel 220.

On the screen 1240 illustrated in FIG. 12D, selection buttons 1241 to select the second setting data available for the image forming apparatus 101-2 are displayed. The user can press the suitable one of the selection buttons 1241 to select the second setting data to import, and then presses the import button 1242 to import the selected second setting data.

In the step S1003, the setting data acquisition unit 426 of the image forming apparatus 101-2 obtains the selected second setting data from the screen 1240 illustrated in FIG. 12D.

With the above processes, the image forming apparatus 101-2 displays the selection list of the available second setting data when setting data stored in the storage medium 105 is the first setting data, and the first setting data is exported from the image forming apparatus 101-1 that is different from the image forming apparatus 101-2. Accordingly, the user can selectively obtain the second setting data to be used for setting, from the available second setting data stored in the server 102.

Figure 11:
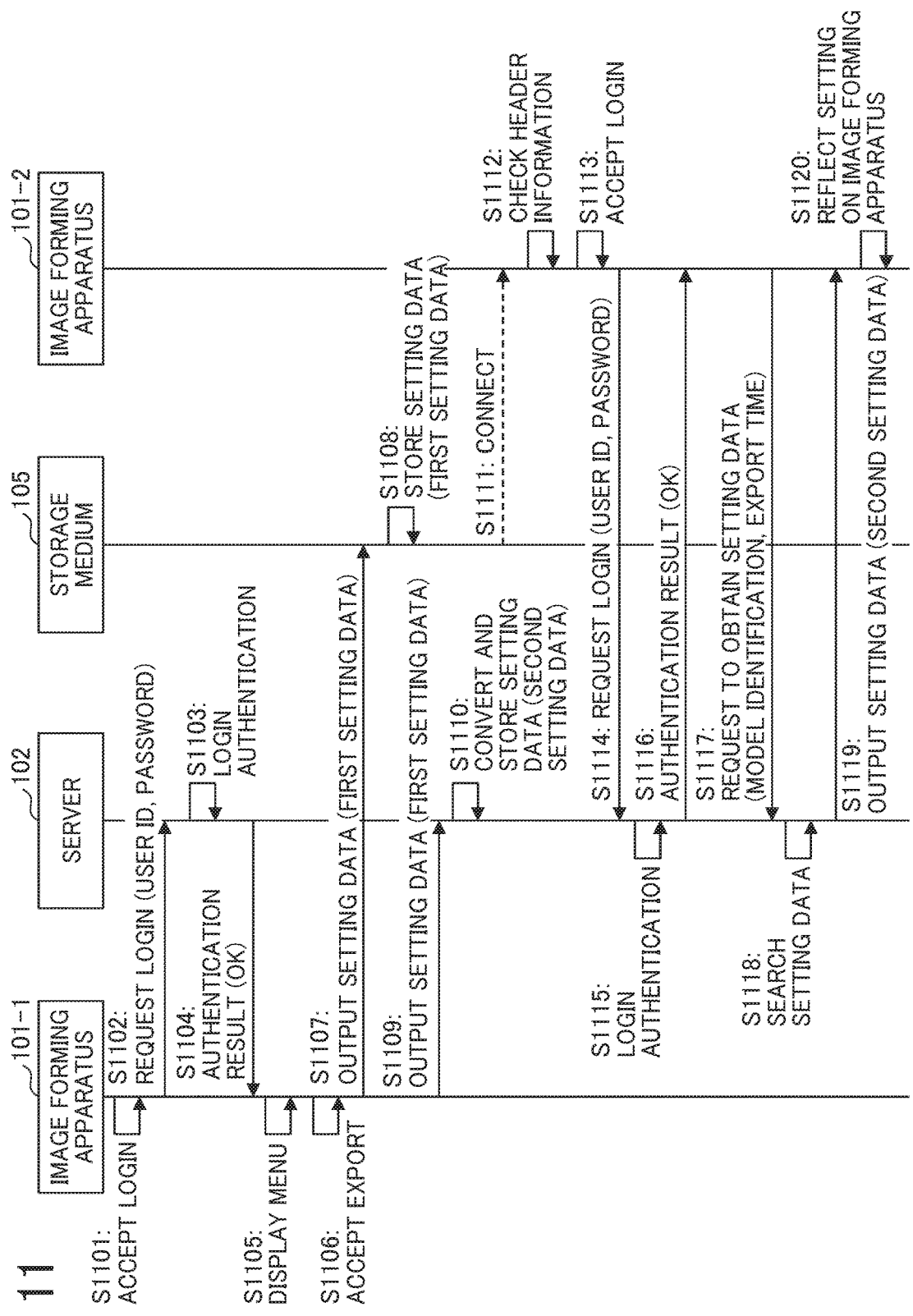
FIG. 11 is a sequence diagram illustrating data setting processes for an information processing system according to the second embodiment.

FIG. 11 is a sequence diagram illustrating data setting processes for the information processing system 100 according to the second embodiment. The diagram illustrates an example of setting processes, where the image forming apparatus 101-1 exports the first setting data to the storage medium 105 and the server 102, and then uses the storage medium 105 that stores the first setting data to update the setting of the image forming apparatus 101-2.

In the step S1101, the image forming apparatus 101-1 accepts the user's login. For example, the display control unit 428 of the image forming apparatus 101-1 displays the login screen 1210 on the operation panel 220 as illustrated in FIG. 12A. The user enters the user ID in the user ID field 1211, and enters the password in the password input field 1212. Then the user presses the login button 1213 to log into the server 102. The operation receiving unit 427 of the image forming apparatus 101-1 accepts the user ID and the password which the user entered.

In the step S1102, the communication control unit 424 of the image forming apparatus 101-1 transmits the login request to the server 102. The login request includes, for example, a user ID and a password accepted in the step S1101.

In the step S1103, the communication control unit 411 of the server 102 authenticates the user in response to the login request.

In the step S1104, the communication control unit 411 of the server 102 notifies the login authentication result to the image forming apparatus 101-1. In the following description, the user's authentication is deemed as accepted.

In the step S1105, the display control unit 428 of the image forming apparatus 101-1 displays, for example, the menu screen 1220 on the operation panel 220 as illustrated in FIG. 12B.

In the step S1106, the operation receiving unit 427 of the image forming apparatus 101-1 accepts the user's export operation.

For example, the user presses the export button 1221 on the menu screen 1220, as illustrated in FIG. 12B. Accordingly, the display control unit 428 of the image forming apparatus 101-1 displays, for example, the export menu screen 1230 on the operation panel 220 as illustrated in FIG. 12C.

Figure 12C:
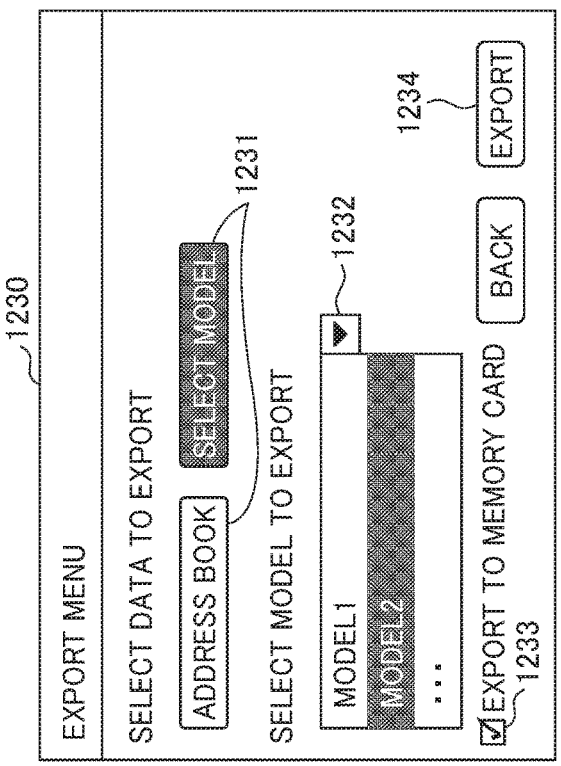

FIG. 12C illustrates an example of the export menu screen 1230 that includes selection buttons 1231 to select the data to export, and the pull-down menu 1232 to select the destination model to export the data.

It is desired that the export menu screen 1230 include a check box 1233 which, when selected, causes to export the first setting data to the storage medium 105 such as a memory card.

The user selects the data to export, the destination model to export the data, or an instruction for exporting the data to the storage medium 105, and presses the export button 1234, on the export menu screen 1230 illustrated in FIG. 12C.

In the step S1107, the setting data output unit 425 of the image forming apparatus 101-1 exports the first setting data of the image forming apparatus 101-1 to the storage medium 105.

In the step S1108, the storage medium 105 stores the first setting data exported from the image forming apparatus 101-1.

In the step S1109, the setting data output unit 425 of the image forming apparatus 101-1 exports the first setting data of the image forming apparatus 101-1 to the server 102.

In the step S1110, the setting data conversion unit 412 of the server 102 converts the first setting data exported from the image forming apparatus 101-1 into the second setting data available for a specified model (such as the image forming apparatus 101-2). Then, the setting data management unit 413 of the server 102 stores the second setting data converted by the setting data conversion unit 412 in the memory unit 414.

In the step S1111, the user connects the storage medium 105 that stores the first setting data of the image forming apparatus 101-1 to the image forming apparatus 101-2.

In the step S1112, the reading unit 421 of the image forming apparatus 101-2 checks the header data of the first setting data of the image forming apparatus 101-1 stored in the storage medium 105. This process corresponds, for example, to the processes described in the steps S701 to S707 illustrated in FIG. 9. Note that the setting data stored in the storage medium 105 is the first setting data that is not yet converted by the server 102, and the first setting data is exported from the image forming apparatus 101-1 that is different from the image forming apparatus 101-2. Accordingly, the process advances to the step S901 in FIG. 9.

In the step S1113, the image forming apparatus 101-2 accepts the user's login. For example, the display control unit 428 of the image forming apparatus 101-2 displays the login screen 1210 on the operation panel 220 as illustrated in FIG. 12A, and allows the user to input the user ID and the password.

In the step S1114, the communication control unit 424 of the image forming apparatus 101-2 transmits a login request to the server 102.

In the step S1115, the communication control unit 411 of the server 102 authenticates the user in response to the login request.

In the step S1116, the communication control unit 411 of the server 102 notifies the login authentication result to the image forming apparatus 101-2. In the following description, the user's authentication is deemed as accepted.

In the step S1117, the input unit 426 of the image forming apparatus 101-2 transmits the request to obtain the setting data to the server 102, to request the server 102 to search and obtain the second setting data. The request to obtain the setting data includes a request to obtain data such as the model identification data of the image forming apparatus 101-2, and the export time obtained from the first setting data stored in the storage medium 105.

In the step S1118, the setting data management unit 413 of the server 102 searches the converted setting data 415 stored in the memory unit 414 for the second setting data that includes the model identification data and the export time, which are requested in the request to obtain the setting data. Here, the second setting data stored in the step S1110 is searched.

In the step S1119, the setting data management unit 413 of the server 102, outputs the searched second setting data to the image forming apparatus 101-2.

In the step S1120, the setting data acquisition unit 426 of the image forming apparatus 101-2 obtains the second setting data that is output from the server 102, and the third setting data setting unit 801 updates the setting of the image forming apparatus 101-2 using the obtained second setting data.

With the above processes, the image forming apparatus 101-2 can update the setting of the image forming apparatus 101-2, when the first setting data exported by the image forming apparatus 101-1 is stored in the storage medium 105.

According to the present embodiments as described above, the setting data of the image forming apparatus 101 can be updated without difficulty, in a system that imports the setting data converted by the server 102 to the image forming apparatus 101, using the storage medium 105 that stores unconverted setting data.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

In one example, the present invention may reside in: an image forming apparatus including: a reading unit to read setting data stored in a storage medium; a determination unit to determine whether the setting data read by the reading unit is first setting data of another image forming apparatus or second setting data of the image forming apparatus; a first setting data setting unit to configure the image forming apparatus using the second setting data, when the setting data read by the reading unit is the second setting data; and a second setting data setting unit to configure the image forming apparatus using the first setting data, when the setting data read by the reading unit is the first setting data and the another image forming apparatus is the same as the image forming apparatus.

In one example, the present invention may reside in: a non-transitory recording medium which, when executed by one or more processors, cause the processors to perform a method of configuring an image forming apparatus.

What is claimed is:

1. An image forming apparatus comprising circuitry configured to:
   read setting data stored in a storage medium;
   determine whether the read setting data is first setting data available for another image forming apparatus or second setting data available for the image forming apparatus;
   configure the image forming apparatus using the second setting data, based on a determination that the read setting data is the second setting data; and
   configure the image forming apparatus using the first setting data, based on a determination that the read setting data is the first setting data and the another image forming apparatus is the same as the image forming apparatus,
   wherein the first setting data includes specific information used to identify the second setting data managed by an information processing apparatus capable of converting the first setting data into the second setting data, and
   the circuitry of the image forming apparatus being further configured to:
   obtain the second setting data from the information processing apparatus using the specific information when the read setting data is the first setting data and the another image forming apparatus is different from the image forming apparatus; and
   configure the image forming apparatus using the second setting data obtained from the information processing apparatus.

2. The image forming apparatus of claim 1,
   wherein the first setting data is output from the another image forming apparatus and includes first apparatus identification data of the another image forming apparatus,
   wherein the circuitry is further configured to determine that the another image forming apparatus is the same as the image forming apparatus upon the first apparatus identification data included in the first setting data being the same as second apparatus identification data of the image forming apparatus.

3. The image forming apparatus of claim 2, wherein the circuitry is further configured to:
control a display to display a selection list of one or more items of second setting data stored in the information processing apparatus upon the read setting data being the first setting data and model identification data included in the first setting data being different from model identification data of the image forming apparatus;
obtain second setting data selected from the selection list, from the information processing apparatus; and
set the setting data of the image forming apparatus, using the second setting data obtained from the information processing apparatus.

4. The image forming apparatus of claim 1, wherein the specific information includes time data indicating when the another image forming apparatus outputs the first setting data to the storage medium.

5. The image forming apparatus of claim 4,
wherein the first setting data is transmitted to the information processing apparatus, in response to storage of the first setting data in the storage medium,
wherein the first setting data received from the another image forming apparatus is converted into the second setting data and stored at the information processing apparatus.

6. The image forming apparatus of claim 1,
wherein the first setting data is transmitted from the another image forming apparatus to the information processing apparatus, in response to storage of the first setting data in the storage medium,
wherein the first setting data received from the another image forming apparatus is converted into the second setting data and stored at the information processing apparatus.

7. The image forming apparatus of claim 1,
wherein the setting data stored in the storage medium includes information indicating whether or not the setting data is converted by the information processing apparatus and model information associated with the setting data,
wherein the circuitry is further configured to determine that the read setting data is the second setting data, upon the read setting data being the setting data converted by the information processing apparatus and the model information indicating a model of the image forming apparatus.

8. The image forming apparatus of claim 1, wherein the circuitry is further configured to:
control a display to display a selection list of one or more items of second setting data stored in the information processing apparatus upon the read setting data being the first setting data and model identification data included in the first setting data being different from model identification data of the image forming apparatus;
obtain second setting data selected from the selection list, from the information processing apparatus; and
set the setting data of the image forming apparatus, using the second setting data obtained from the information processing apparatus.

9. An information processing system comprising:
an image forming apparatus comprising first circuitry configured to;
read setting data stored in a storage medium,
determine whether the read setting data is first setting data available for another image forming apparatus or second setting data available for the image forming apparatus,
configure the image forming apparatus using the second setting data upon the read setting data being determined to be the second setting data, and
configure the image forming apparatus using the first setting data upon the read setting data being determined to be the first setting data and upon the another image forming apparatus being the same as the image forming apparatus; and
an information processing apparatus comprising second circuitry to convert the first setting data into the second setting data available for the image forming apparatus,
wherein the first setting data includes specific information used to identify the second setting data managed by the information processing apparatus, and wherein the first circuitry of the image forming apparatus is further configured to:
obtain the second setting data from the information processing apparatus using the specific information upon, the read setting data being determined to be the first setting data and upon the another image forming apparatus being different from the image forming apparatus; and
configure the image forming apparatus using the second setting data obtained from the information processing apparatus.

10. The information processing system of claim 9,
wherein the first setting data is output from the another image forming apparatus and includes first apparatus identification data of the another image forming apparatus,
wherein the first circuitry of the image forming apparatus is further configured to determine that the another image forming apparatus is the same as the image forming apparatus upon the first apparatus identification data included in the first setting data being the same as second apparatus identification data of the image forming apparatus.

11. The image forming apparatus of claim 9, wherein the specific information includes time data indicating when the another image forming apparatus outputs the first setting data to the storage medium.

12. The image forming apparatus of claim 9,
wherein the first setting data is transmitted from the another image forming apparatus to the information processing apparatus, in response to storage of the first setting data in the storage medium,
wherein the second circuitry of the information processing apparatus is further configured to store the converted second setting data in a memory.

13. A method of configuring an image forming apparatus, the method comprising:
reading setting data stored in a storage medium;
determining whether the read setting data is first setting data of another image forming apparatus or second setting data of the image forming apparatus,
wherein upon the read setting data being determined to be the second setting data based upon the determining, the method further comprising configuring the image forming apparatus using the second setting data, and
wherein upon the read setting data being determined to be the first setting data based upon the determining, the method further comprising determining whether the another image forming apparatus is same as the image forming apparatus;

configuring the image forming apparatus using the first setting data, upon the another image forming apparatus being the same as the image forming apparatus, wherein the first setting data includes specific information used to identify the second setting data managed by an information processing apparatus capable of converting the first setting data into the second setting data; and obtaining the second setting data from the information processing apparatus using the specific information upon the read setting data being determined to be the first setting data based upon the determining and upon the another image forming apparatus being different from the image forming apparatus, wherein the configuring includes configuring the image forming apparatus using the second setting data obtained by the obtaining.

14. The method of claim 13, wherein the first setting data is output from the another image forming apparatus and includes first apparatus identification data of the another image forming apparatus, wherein the determining includes determining whether the another image forming apparatus is same as the image forming apparatus, and further includes determining the another image forming apparatus to be same as the image forming apparatus based on a determination of the first apparatus identification data included in the first setting data being the same as second apparatus identification data of the image forming apparatus.

15. The method of claim 13, wherein the specific information includes time data indicating when the another image forming apparatus outputs the first setting data.

16. The method of claim 13, further comprising:

transmitting the first setting data from the another image forming apparatus to the information processing apparatus, in response to storage of the first setting data in the storage medium;

at the information processing apparatus, converting the first setting data received from the another image forming apparatus into the second setting data; and at the information processing apparatus, storing the second setting data converted by the converting.

* * * * *